United States Patent
Bryant

Patent Number: 6,012,871
Date of Patent: Jan. 11, 2000

[54] SEPTIC TANK SYSTEM AND DISTRIBUTION DEVICE SUITABLE FOR USE IN SLOPING TERRAIN

[75] Inventor: R. Steven Bryant, Lenoir, N.C.

[73] Assignee: King Greek Precast, Inc., Lenoir, N.C.

[21] Appl. No.: 08/938,495

[22] Filed: Sep. 26, 1997

[51] Int. Cl.[7] .............................. E02B 13/00; F16L 41/00
[52] U.S. Cl. .............................. 405/40; 405/51; 210/170; 285/132.1
[58] Field of Search .................................. 405/40, 43, 44, 405/47, 51; 210/101, 170; 285/132.1, 129.2, 37–46

[56] References Cited

U.S. PATENT DOCUMENTS

| | | | |
|---|---|---|---|
| 4,293,237 | 10/1981 | Robey et al. | 405/39 |
| 4,298,470 | 11/1981 | Stallings | 405/39 |
| 4,756,827 | 7/1988 | Mayer | 405/40 |
| 4,838,731 | 6/1989 | Gavin | 405/40 |
| 5,322,387 | 6/1994 | Heine et al. | 405/36 |

*Primary Examiner*—William Neuder
*Assistant Examiner*—Tara L. Mayo

[57] ABSTRACT

A distribution device is suitable for apportioning effluent discharged by a settling tank among first and second outlets. A receptacle includes an interior chamber, an inlet, and first and second outlets. A dam partially blocks the second outlet. Effluent flows solely through the first outlet until the surface level of the effluent rises to a level sufficient to spill over the dam to begin flow to the second outlet. The receptacle may be a plastic pipe tee. An underground distribution system may use several such devices to initially direct flow to areas of a leaching field having a relatively high ground surface elevation.

3 Claims, 3 Drawing Sheets

SEPTIC TANK SYSTEM AND DISTRIBUTION DEVICE SUITABLE FOR USE IN SLOPING TERRAIN

BACKGROUND OF THE INVENTION

This invention relates to septic tank systems, and more particularly pertains to passive devices for apportioning the flow of effluent from a settling tank into separate nitrification trenches or lines in a subsurface disposal field. The terms "leaching field" and "nitrification field" are considered synonymous.

The soil on a building site is sometimes used as a medium for treatment and disposal of wastewater, including sewage emanating from a residence. A septic tank system is a subsurface wastewater system consisting of a settling tank and a subsurface disposal field. By the use of a septic tank system, wastewater is absorbed into the soil. Installation of septic tank systems in an improper manner or has a detrimental effect on the public health and environment through contamination of land, groundwater, and surface waters.

In a typical septic tank system, wastewater is discharged from a residence or other building into a settling tank, widely known as a septic tank. The settling tank is a water-tight, covered receptacle typically including two compartments. The settling tank receives the discharge of wastewater from a building, separates settleable and floating solids from the liquid, digests organic matter by anaerobic bacterial action, stores digested solids through a period of detention, and allows clarified liquid, herein called effluent, to discharge for additional treatment and final disposal. The effluent ultimately is received by a plurality of nitrification trenches or lines in a nitrification field. Each nitrification trench usually includes a perforated pipe. Distribution devices apportion the flow of effluent to the several nitrification trenches.

The distribution devices are designed to avoid overloading of effluent within a single nitrification trench. Should overloading occur, effluent often rises to the ground surface, resulting in an unhealthy and malodorous condition. The system must then be pumped out to restore the system to working condition.

Although pumps or siphons are sometimes used in a septic tank system, gravity distribution is very widely used. The advantages of gravity distribution include low cost, ease of installation, and little maintenance. Gravity distribution type septic tank systems are subject, however, to poor distribution to the nitrification trenches and local overloading within trenches.

Parallel distribution gravity type septic tank systems are often used, particularly where the ground surface is of fairly level grade. In a typical parallel distribution type septic tank system, a conduit directs effluent from the settling tank to the inlet of a distribution box. The distribution box is also provided with several outlets. Each outlet is connected to a pipe which proceeds to a lateral nitrification trench. Therefore, it is necessary to provide each outlet on the same level in order to provide equal flow to the several outlet pipes. In practice, it is difficult to provide outlet holes which are on exactly the same level.

In a serial distribution type septic tank system, flow of effluent is first directed to a first nitrification trench and thereafter directed to other nitrification trenches. If a parallel type system is used with a sloping nitrification field, the system tends to overload first in the nitrification trench at the lowest grade. For this reason, serial distribution type septic tank systems are often used in sites where the ground surface is not of level grade. Effluent flow is first directed to the nitrification trench at the highest grade, and thereafter is directed to the nitrification trench at the next highest grade, and in the same manner is directed to the nitrification trenches in order of their grade until finally effluent is directed to the nitrification trench at the lowest grade.

Serial flow distribution as described in the immediately preceding paragraph is typically accomplished through the use of drop boxes. A drop box is constructed such that the inlet is at a first elevation and the outlet to the nitrification trench lateral is at a second elevation, lower than the first elevation; and the outlet to the next lower drop box is at a third elevation, which is at a level which is lower than the first elevation but higher than the second elevation. After the nitrification trench supplied by nitrification trench lateral (at the second elevation) is filled, effluent rises to the level of the third elevation to flow to the next lower drop box.

One description of drop box design is contained in North Carolina Administrative Code, title 18, section 1955 (1), which requires that the top of the trench outlet laterals (at the second elevation as hereinabove described) be two inches below the outlet to the next lower drop box (at the third elevation as hereinabove described). The conventional drop box design not only fully utilizes the nitrification trench supplied by the outlet at the second elevation, but in fact tends to overload the trench. Thus, the conventional drop box design often prematurely fails at the highest grade nitrification trench in an effort to avoid premature failure at the lowest grade nitrification trench. And, by completely filling the nitrification trench, the conventional drop box design causes the air at the top of the nitrification line to be forced out, inhibiting the on-site treatment process.

After being installed underground for a period of time, the drop box may become out of level, possibly impairing its function. As a drop box occupies a rather large volume of space, hydrostatic pressure and frost heave may force the drop box upward, in some cases actually to the ground surface. This problem is one reason why the drop box is often formed of concrete, which has a sizable weight density.

SUMMARY OF THE INVENTION

It is therefore an object of the present invention to provide a septic tank distribution device which achieves serial flow distribution while avoiding overload of the trench first receiving effluent.

Another object of the present invention is to provide a serial flow distribution type septic tank distribution device which is lighter and occupies a smaller volume than the conventional drop box.

Still another object of the present invention is to provide a septic tank distribution system capable of operating by means of passive gravity flow and is less subject premature failure due to installer error, frost heave, or overloading of a single leaching field trench.

These and other objects are provided by a distribution device suitable for apportioning effluent discharged by a settling tank among first and second outlets. A receptacle includes an interior chamber, an inlet, and first and second outlets. A dam partially blocks the second outlet. Effluent flows solely through the first outlet until the surface level of the effluent rises to a level sufficient to spill over the dam to begin flow to the second outlet. The receptacle may be a plastic pipe tee. An underground distribution system may use several such devices to initially direct flow to areas of a leaching field having a relatively high ground surface elevation.

BRIEF DESCRIPTION OF THE DRAWINGS

In order to facilitate a better understanding of the characteristics of the invention to those skilled in the art, a detailed description will be made on the basis of the accompanying drawings. Like numbers refer to like elements. The drawings are not necessarily drawn to scale.

BRIEF DESCRIPTION OF THE PREFERRED EMBODIMENT

Figure 1:
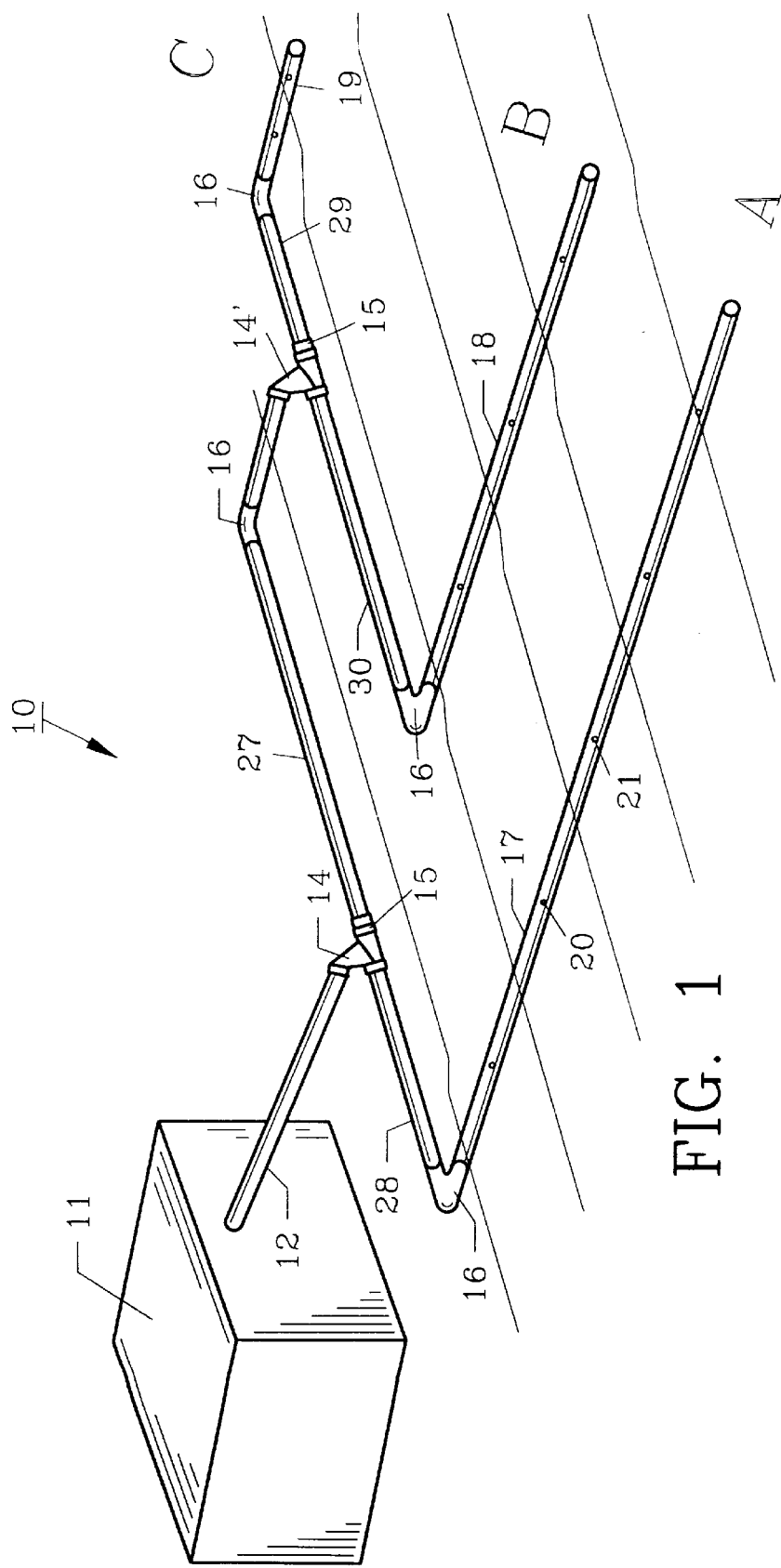
FIG. 1 is a schematic view of an underground septic tank distribution system according to the invention installed in an area in which the ground surface is not level.

An underground septic tank distribution system 10 as shown in FIG. 1 includes a conduit 12 carrying effluent discharged from settling tank (septic tank) 11. The leaching or nitrification field in which the system 10 is installed includes areas A, B, and C. Pipe 17 distributes effluent in area A; pipe 18 distributes effluent in area B; and pipe 19 distributes effluent in area C. Each of pipes 18, 19, and 17 includes perforations 20, 21 which allow the effluent to gain access to the gravel surrounding the pipes and the surrounding soil, the gravel and soil not being shown in order to simplify the drawing. In the system 10 shown, a substantial portion of the ground surface over area A is at an elevation higher than a substantial portion of the ground surface over area B; and a substantial portion of the ground surface over area B is at an elevation higher than a substantial portion of the ground surface over area A. Thus, the ground surface slopes generally downward in the direction from A to C. If the pit in which pipes 18, 19, and 17 are laid is graded level prior to installation and a parallel feed type distribution system is utilized, effluent may overload area C before areas A and B are fully utilized.

Figure 2:
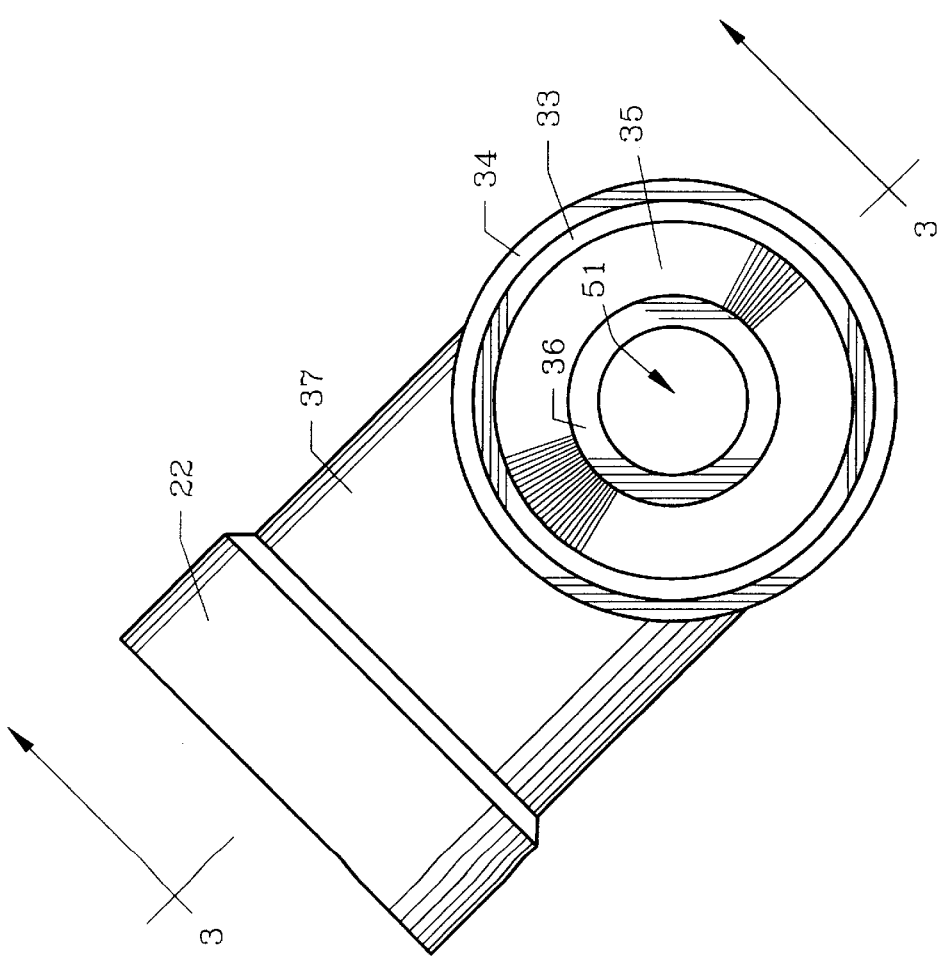
FIG. 2 is a side elevation view of a device according to the invention.
Figure 3:
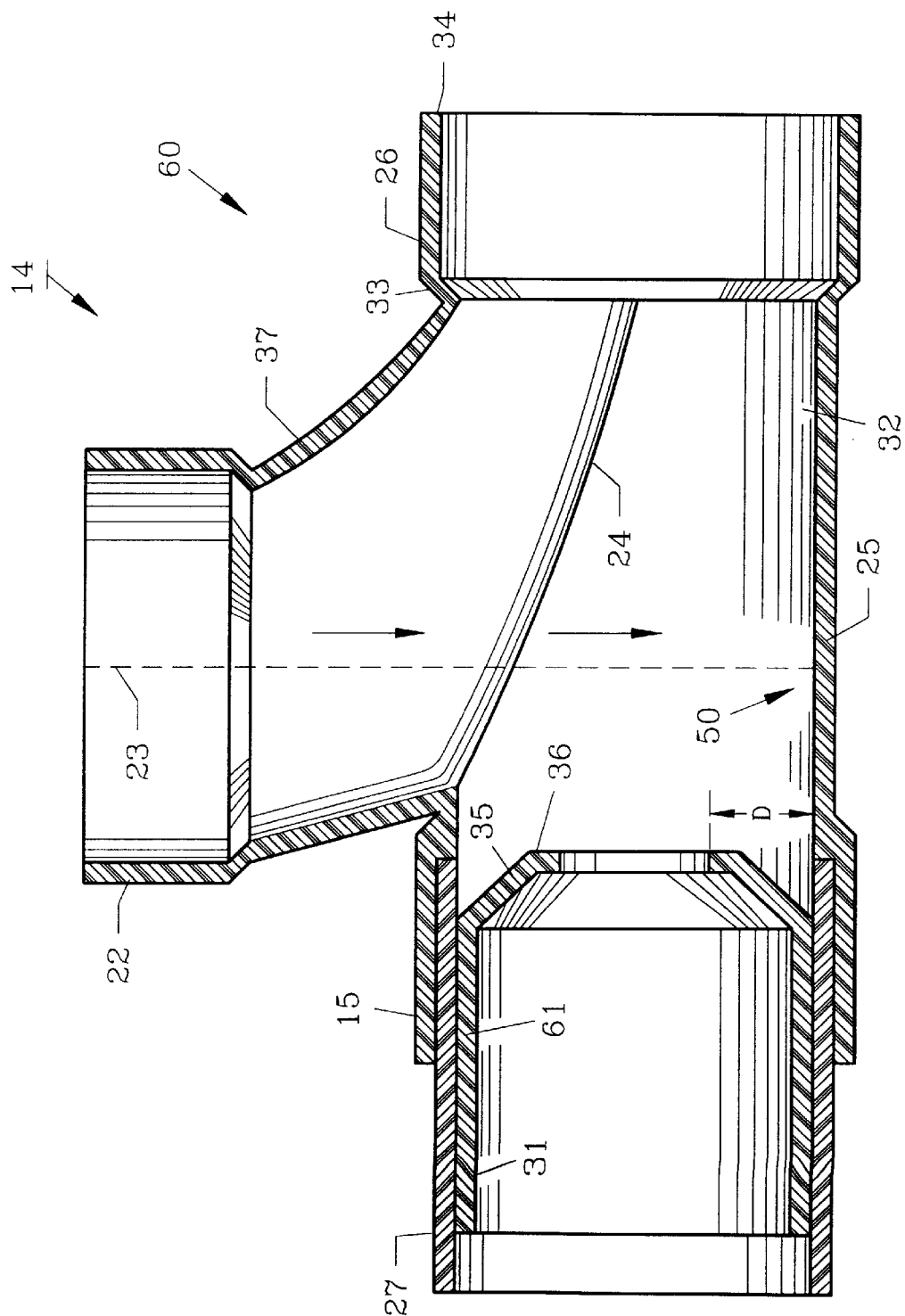
FIG. 3 is a longitudinal sectional view along lines 3—3 of the device of FIG. 2.

An improved distribution device 14 for use in underground septic tank distribution systems is shown in FIGS. 2 and 3. Device 14 includes a receptacle 60. Receptacle 60 may take the form of a conventional pipe tee formed from molded plastic, and includes an inlet 22, first outlet 26, and second outlet 15. Its interior surface 32 includes an inflection line 24 and forms a chamber which receives effluent discharged from septic tank 11.

Considering together FIGS. 1 and 3, effluent is carried by conduit 12 from septic tank 11 to inlet 22 of first device 14. Effluent proceeds into the chamber formed by interior surface 32, and thence through first outlet 26 to lateral pipe 28 and pipe 17; or through a second outlet 15 to lateral pipe 27 and thence to second device 14'. Effluent proceeds in the same manner from second device 14' through either first outlet 26 to pipe 30 and thence to pipe 18, or through second outlet 15 to pipe 29 and pipe 19. Pipe elbows 16 are used throughout the system as required.

The construction of first device 14 will now be described in detail. First device 14 and second device 14' may be of the same construction; however, pipe 27 is shown connected to first device 14 of FIG. 3 for ease of understanding. First device 14 comprises a pipe tee receptacle 60 and a pipe 61 mounted within the second outlet 15 thereof by an epoxy adhesive. One end of pipe 27, connecting first device 14 to leaching field pipe 21, is mounted by epoxy between the interior surface of second outlet 15 and the exterior surface of pipe 61.

A dam 35, 36 is mounted to pipe 31, thereby separating first outlet 26 from second outlet 15. In the particular embodiment illustrated, dam 35, 36 comprises a frusto-conical section 35 mounted at its radially outermost surface to pipe 31, and an annular section 36 mounted to the radially innermnost surface of frusto-conical section 35. As best seen in FIG. 2, a bore 51, concentric with interior surface 31 of pipe 61, is delimited by annular section 36.

As effluent seeps through inlet 22 into the receptacle 60, it may be imagined to follow the dashed line represented in FIG. 3 through neck 37 from point 23 along the arrows shown to point 50. From thence it flows outward through a widening section 33 to first outlet 26, which has an exterior surface 34 as seen in the side elevation view of FIG. 2. Effluent is initially blocked from flowing through second outlet 15 by dam 35, 36.

When the surface level of the effluent has risen to a level shown in FIG. 3 by the distance D, it can spill over dam 35, 36 and commence flow through first outlet 15. Device 14 is designed such that spillover occurs before first outlet 26 is filled with effluent, thereby helping to avoid overload of that section of the leaching field supplied by first outlet 15.

Viewed through FIG. 2, the orientation of inlet 22 of device 14 may be between 0 degrees and 180 degrees, taking the right hand direction as zero as is conventional. If bore 51 is concentric with interior surface 31 of pipe 61 (see FIG. 3), the distance D is invariant to the orientation of inlet 22. Thus, device 14 is made foolproof to this extent. Of course, section 36 may assume different shapes which could vary the height of effluent spillover, but such is not believed desirable in most systems.

Although device 14 may be formed of concrete or other heavy materials, it is preferred to form device 14 of lightweight, strong plastic such as polypropylene. The small volume occupied by a plastic tee makes it less necessary to add weight to device 14 to avoid hydraulic or frost heave.

The pipe 61 and integral dam sections 35, 36 of FIG. 3 are the result of providing a section of reducer pipe which is cut so as to remove the section of reduced diameter. Clearly, the device 14 may be formed in mass quantities by molding the dam integral with tee 60. The dam may take the form of an annulus or may be frusto-conical in the direction of either first outlet 26 or second outlet 15. The spillover level represented by distance D is the important consideration for the system designer. By use of a pipe tee design with a substantially cylindrical surface 25, design considerations are simplified.

Returning now to FIG. 1, it will be seen that effluent flow is first directed by device 14 to pipe 17 in leaching field area A of highest elevation. Effluent thereafter spills over into pipe section 27 to device 14'. Effluent reaching device 14' is initially directed to pipe 30 and pipe 18 in leaching field area B of medial elevation. Effluent thereafter spills over into pipe 29 to pipe 19 in leaching field area C of lowest elevation.

The pipe tee used in the preferred embodiment is designed for use with pipe having an inside diameter of four inches. However, if pipe of another diameter is used, the pipe tee may be modified accordingly.

Distribution devices according to the invention may be embodied in forms differing in detail from that described in the preferred embodiment. For instance, a quad type distribution device may be provided with an inlet, two dammed outlets, and one undammed outlet; or such a device may be provided with an inlet, two undammed outlets, and one dammed outlet. Other devices may be used, so long as at least one outlet is dammed and the other is undammed.

Distribution devices according to the invention also may be used to allocate effluent among different drain fields, as well as among different lines in the same drain field. Distribution devices according to the invention may be placed in a linear relationship. The particular placement and configuration of a distribution device, and systems in which a distribution device are incorporated, will necessarily differ according to the terrain, effluent load, type and duration of use, and other factors considered by the system designer.

Since the invention may be embodied in several forms without departing from the spirit or essential characteristics thereof, the preceding description is intended to be illustrative and not restrictive, since the scope of the invention is defined by the claims rather than by the description preceding them.

What is claimed is:

1. A septic tank system distribution device suitable for apportioning effluent discharged by a settling tank among first and second outlets comprising:

a receptacle having an interior surface delimiting a chamber;

a receptacle inlet for the intake of effluent having been discharged by a settling tank and received into said receptacle, whereby such effluent flows into said chamber;

a receptacle first outlet suitable for discharging effluent from said chamber;

a receptacle second outlet for discharging effluent from said chamber, wherein said receptacle comprises a pipe tee including said inlet and said first and second outlets;

a pipe, said pipe mounted within said second outlet, said pipe including an interior surface having a first diameter; and a dam within said receptacle separating said receptacle second outlet from said receptacle first outlet, said dam mounted to said pipe and projecting radially inward from said pipe interior surface to delimit a bore, whereby effluent received into said chamber flows through said first outlet until such effluent has risen to a level sufficient to spill over said dam to flow through said second outlet.

2. A septic tank system distribution device as set out in claim 1, wherein said tee pipe is formed from plastic material.

3. A septic tank system distribution device as set out in claim 1 wherein said bore is concentric with said pipe interior surface.

* * * * *